July 2, 1935. J. M. SIMPSON 2,007,006

FREEWHEELING MECHANISM

Filed Nov. 27, 1931 2 Sheets-Sheet 1

INVENTOR.
John M. Simpson,
BY Hood & Hahn.
ATTORNEYS.

July 2, 1935.　　　J. M. SIMPSON　　　2,007,006
FREEWHEELING MECHANISM
Filed Nov. 27, 1931　　2 Sheets-Sheet 2
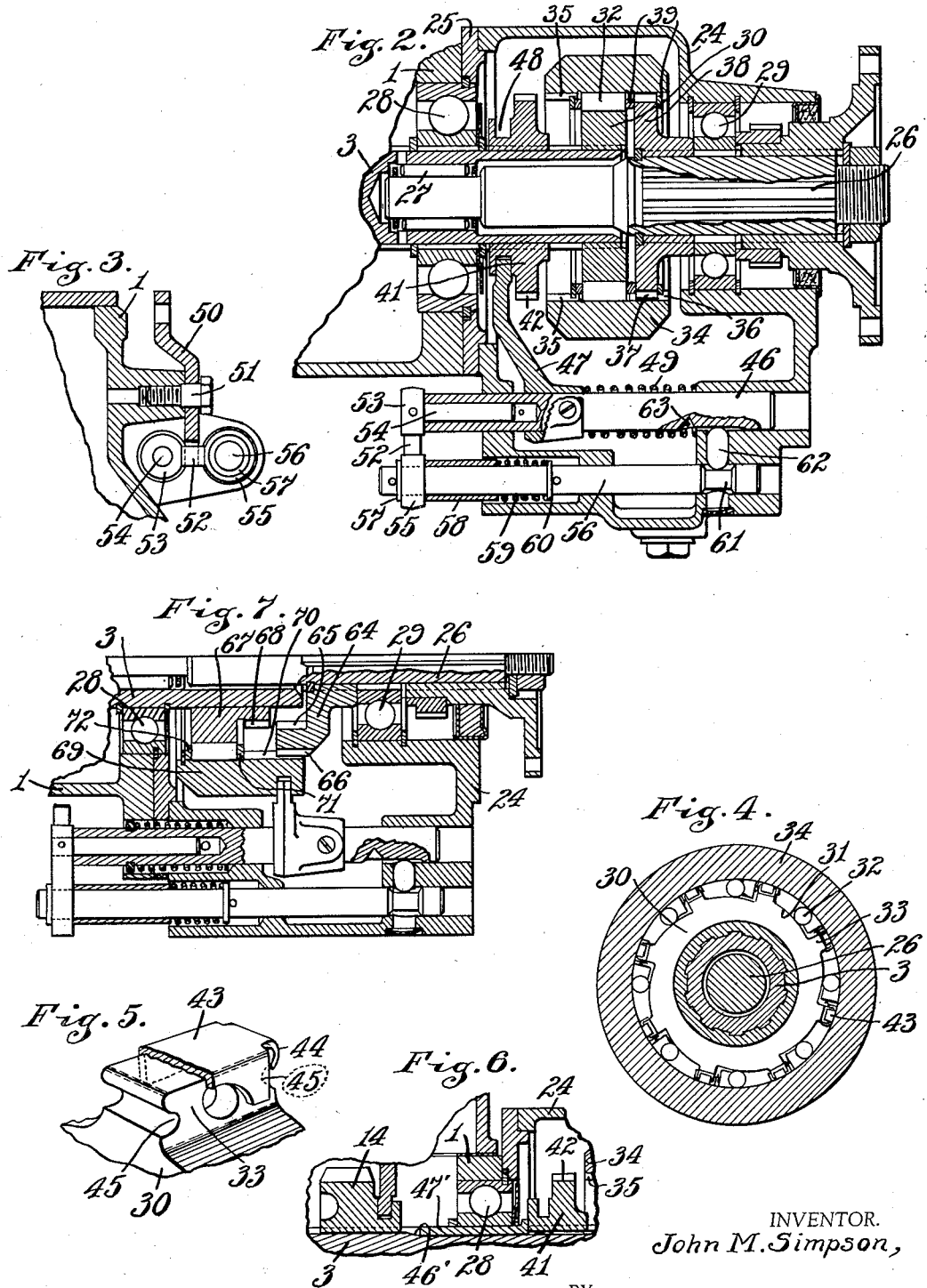
INVENTOR.
John M. Simpson,
BY
Hood & Hahn
ATTORNEYS Patented July 2, 1935

2,007,006

UNITED STATES PATENT OFFICE 2,007,006

FREE WHEELING MECHANISM

John M. Simpson, Muncie, Ind., assignor, by mesne assignments, to Free Wheeling Patents Corporation, South Bend, Ind., a corporation of Delaware Application November 27, 1931, Serial No. 577,563

15 Claims. (Cl. 74—343)

My invention relates to improvements in free wheeling mechanism for automobiles and has more particularly as one of its objects that of providing improved means for controlling the operation of the free wheeling device.

Where free wheeling devices are used, particularly at the rear of the transmission it is desirable that means be provided for locking up the free wheeling device when the transmission is shifted into reverse drive. It is also desirable that when the transmission is again shifted out of reverse drive the free wheeling device be restored to free wheeling position. It is also desirable that means be provided for locking up the free wheeling device, at the option of the operator, and allowing the same to be locked up irrespective of the direction of the drive of the automobile.

My invention has for one of its objects the accomplishment of both the above desired results. For the purpose of disclosing my invention I have illustrated the same in connection with one type of transmission with which it is particularly desirable to provide a free wheeling mechanism, but it will be understood that this same mechanism may be used in connection with various types of transmissions.

In the drawings illustrating certain embodiments of my invention—

Fig. 2 is an enlarged detailed sectional view showing the free wheeling mechanism and its operating mechanism;

Fig. 3 is a detailed section showing the lock up lever;

Fig. 4 is a transverse sectional view of a free wheeling clutch of the type used in connection with my invention;

Fig. 5 is a perspective view of a portion of the clutch showing the friction reducing caps;

Fig. 6 is a detailed section showing the manner of moving the free wheeling mechanism into lock up position upon going into reverse drive, and Fig. 7 is a detailed section showing the modification of my invention.

Figure 1:
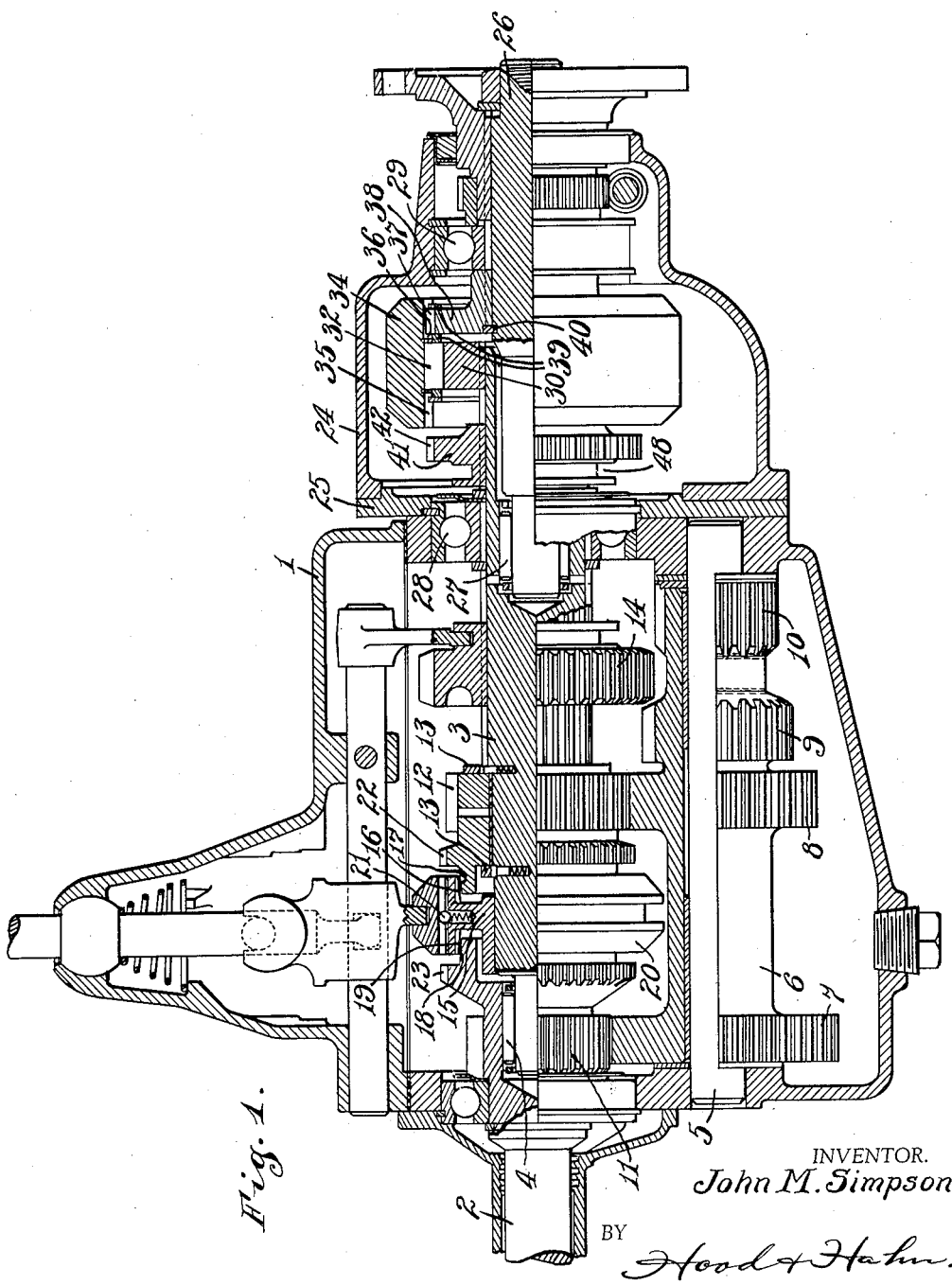
Fig. 1 is a longitudinal sectional view of a transmission and free wheeling device embodying my invention.

Referring more particularly to Figs. 1 to 6, in the structure illustrated I provide a transmission having the usual transmission housing 1 into which is adapted to extend the aligned driving shaft 2 and driven shaft 3, the driven shaft 3 being piloted as at 4 in the hollow end of the driving shaft. Mounted below the driven shaft is a counter shaft 5 having rotatably mounted thereon a spindle 6 provided with the gears 7, 8, 9 and 10. The gear 7 is in constant mesh with a gear 11 formed on the driving shaft 2 whereby the spindle 6 is driven from the drive shaft. The gear 8 is in constant mesh with a gear 12 normally rotatably mounted on the driven shaft 3 and held against axial displacement on the shaft by suitable washers 13, 13. The gear 9 is adapted to be meshed with axially slidable gear 14 splined on the shaft 3, which gear 14 is also adapted to mesh with an idler (not shown) in mesh with the gear 10 for reverse drive.

Splined on the shaft 3, and axially movable thereon, is a clutch member 15 having a clutch face 16 adapted to engage a clutch face 17 on the gear 12 and a second clutch face 18 adapted to engage a clutch face 19 on the shaft 2. Splined on the clutch member 15 is a locking ring 20 releasably held against axial displacement on the clutch member 15 by suitable spring operated poppets 21. The splined teeth of the member 20 are adapted to engage respectively the teeth 22 on the gear 12 or the teeth 23 on the shaft 2.

In operation the meshing of the gear 14 with the gear 9 will drive the driven shaft 3 at low speed. By shifting the member 20 to the right, looking at Fig. 1, the clutch member and locking member will be moved in unison, moving the friction clutch face 16 into engagement with the clutch face 17 to bring the speed of shaft 3 into synchronism with the speed of the gear 12. A continued movement of the locking member 20 then meshes the teeth thereof with the teeth 22 on the gear 12 thus positively connecting the gear with the shaft. This drives the driven shaft at second speed. A shifting of the locking member 20 to the left will through the same process engage its teeth with the teeth 23 on the shaft 2 thereby directly connecting the shafts and operating the shaft 3 at high speed.

On the rear end of the transmission casing 1, I mount a supplemental casing 24, the front wall 25 of which lies against the rear wall of the casing 1 and forms a centering plate for the casing 24. The driven shaft 3 is extended into this casing and has piloted therein the propeller shaft 26 and it will be noted that the rollers 27 for the piloted end of the propeller shaft are in substantial vertical alignment with a ball bearing 28 of the driven shaft 3. The propeller shaft is also supported at its rear end in a ball bearing 29 in the rear end of the casing 24. Mounted on the rear end of the driven shaft 3 is the inner member 30 of an overrunning clutch. This member is preferably formed with a series of cammed surfaces 31, each adapted to receive a wedging roller 32, and the shoulders which form the rear wall of the cams are extended to provide radially extending fingers 33, the purpose of which will more fully hereinafter appear. Surrounding this inner member 30 of the overrunning clutch is an outer member 34 which is secured to the propeller shaft. The outer member could be made integral with the propeller shaft, but for the purpose of assembly I prefer to make this outer member open from end to end forming internal teeth 35 and 36 therein. The internal teeth 36 slip over and engage external teeth 37 on a hub 38 splined on the propeller shaft. Suitable snap rings 39 hold the member 34 against axial displacement on the hub 38 and the hub is held against axial displacement by a suitable snap ring 40 and the inner race of the ball bearing 29. This arrangement in effect makes the outer member 34, of the overrunning clutch, a part of the propeller shaft 26. Therefore, by this construction the propeller shaft and driven shaft 3 are adapted to be connected together through the medium of the overrunning clutch which, while permitting the propeller shaft to be driven from the engine, will disconnect the propeller shaft from the engine in event the propeller shaft operates at a greater speed than the engine shaft. In order to lock up the overrunning clutch so that the propeller shaft 26 and driven shaft 3 may be driven together in either direction I provide on the driven shaft 3 an axially movable two-way clutch member 41 provided with teeth 42 adapted to be moved into engagement with the teeth 35 of the outer clutch member 34.

As before stated the front end of the propeller shaft 26 is piloted in the rear end of the driven shaft 3 in rollers in alignment with the bearing 28. This arrangement, together with the bearing 29, forms a support for the propeller shaft in such a manner that the weight of the clutch members above described will not tend to cause a whipping action on the part of the propeller shaft and will tend to stiffen the shaft. Furthermore in order to prevent any whipping action on the part of the clutch member 34 the radial projections 33, on the inner member, run in very close proximity to the inner surface of the member 34 and to prevent scoring of the inner member I cover these projections 33 with soft metal caps 43 which may be of bronze, brass or other suitable material. These caps have down turned flanges 44 which turn into grooves 45 in the projections to maintain the caps in position.

As the free wheeling unit is located to the rear of the transmission or between the transmission and the propeller shaft, it is necessary to provide some means for locking up the free wheeling device whenever the transmission is shifted into reverse. For this purpose the propeller shaft 3 is provided with an extra deep splined groove 46' into which is placed an axially shiftable key 47', one end of which abuts against the hub of the gear 14 and the other end of which abuts against the hub of the two-way clutch member 41, the pin being adapted to pass beneath the ball bearing 28. Therefore, when the gear 14 is shifted into reverse this movement will be transmitted to the clutch member 41 moving the same axially to cause the teeth 42 thereof to mesh with the teeth 35 on the outer member 34 of the overrunning clutch, thereby locking up the clutch and permitting the propeller shaft to be driven in reverse direction from the driven shaft 3.

For manually locking up the overrunning clutch, whenever desired, so that the transmission will operate in the conventional manner, I provide a shift rod 46, suitably supported in the supplemental casing 24 and provided with a shifting fork 47 taking into a groove 48 in the two-way clutch member 41. This shift rod 46 is biased in a non-lock up direction by means of a coiled spring 49 interposed between the hub of the shift fork 47 and a portion of the casing 24 and surrounding the shift rod. The shift rod is operated through the instrumentality of a lever 50 pivoted at 51 to the side of the casing 1, and manipulated by any suitable means such as a lever in the floor board of the car or a Bowden wire connection extending to any convenient point for the operator. The lower end of this lever engages a bridge member 52 having one end 53 lying in front of the shift rod 46 and provided with a pin 54 extending into a recess in this rod. The other end is provided with a ring 55 surrounding a lock up rod 56 slidably mounted in the casing 24 and lying parallel with the shift rod 46. Movement of the ring 55 is imparted to the rod 56 in one direction by a collar 57 pinned on the end of the rod 56, and in the opposite direction through the medium of a sleeve 58 and coiled spring 59 interposed between the ring 55 and another collar 60 likewise pinned on the rod 56. The rear end of the rod 56 is recessed or grooved as at 61 to receive one end of a plunger 62 normally held in this groove by the shift rod 46, but adapted to be permitted to retract from the groove into a recess 63 in the shift rod.

In operation, when the overruning clutch is in non-lock up position and the transmission mechanism is shifted into reverse thereby moving the clutch member 41 into engagement with the outer overrunning clutch member 34, the shift rod 46 will be moved to the right, looking at Fig. 2, compressing the spring 49 and as soon as the transmission mechanism is shifted out of reverse drive the spring 49 will also move the clutch member 41 out of its engaging position. This arrangement therefore insures the movement back into free wheeling position whenever the transmission mechanism is shifted to reverse with the free wheeling clutch in non-lock up position.

If at any time the operator desires to manually lock up the free wheeling mechanism he merely manipulates the lever 50 to shift the shift rod 46 to the right, looking at Fig. 2, which, of course will shift the two-way clutch member 41 into lock up position. This movement compresses the coiled spring 49 and it will be noted that this same movement through the instrumentality of the ring 55 and the sleeve 58 compresses the coiled spring 59. The rod 56, however, during the initial part of the movement of the shift rod 46, is held against rearward movement, to the right, looking at Fig. 2, by the plunger 62. As soon, however, as the recess 63 in shift rod 46 comes opposite the plunger 62, which is at the limit of the movement of the shifter rail to its lock-up position, the plunger will be projected thereinto, due to the camming action of the shoulders on the sides of the grooves 61, thereby locking the shift rod 46 in its rearward position and holding the same locked in this position because by this time the lock up rod 56 has been projected rearwardly under the influence of the spring 59 bringing the groove 61 past the plunger 62 and preventing the same from moving out of the recess 63.

The overrunning clutch mechanism is now locked up and will remain in this condition as long as desired.

Whenever the operator desires to shift back into free wheeling, he manipulates the lever 59 to move the sleeve 55 forward, to the left, looking at Fig. 2, which will, through the collar 57, move the lock up rod 56 forward until the groove 61 is again opposite the plunger 62. This permits the plunger to take into the groove 61 and out of the recess 63, releasing the shift rod 46 and permitting the same, under the influence of the spring 49, to shift to the left, looking at Fig. 2, thereby shifting the two-way clutch member 41 out of lock up engagement.

In Fig. 7 I have illustrated a modification of the invention illustrated in Figs. 1 to 6. In this structure the two-way clutch member 64 is secured to the propeller shaft 26 and is provided with internal teeth 65 and external teeth 66. The inner member 67 of the one-way clutch is splined and axially movable on the driven shaft 3 and its hub is provided with external two-way clutch teeth 68. The outer member 69 of the overrunning clutch surrounds the inner member 67 and is provided with internal teeth 70 meshing with the external teeth 66. This outer member is secured to move axially with the inner member by means of suitable snap rings 71 and 72 so that the entire overrunning clutch moves as a unit. In other respects the overrunning clutch is of the same construction as that illustrated in connection with Figs. 1 to 6 inclusive. When the overrunning clutch is in non-lock up position the parts are in the position shown in Fig. 7 with the teeth 66 and 70 in mesh. If it is desired to lock up the overrunning clutch the entire overrunning clutch unit is moved to the right by the same shifting means heretofore described, until the teeth 68 mesh with the teeth 65 under which circumstances the propeller shaft is driven from the driven shaft 3 through the two-way clutch mechanism.

I claim the following:

1. In a transmission, the combination with a driving shaft, a driven shaft and shiftable gearing for drivingly connecting said shafts, of a one-way clutch and a two-way clutch associated with said driven shaft, a shifter member for one of the elements of said two-way clutch biased to maintain said element in a non-operative position, operator control means for operating said shifter member against its bias, means operated by said operator control means for locking said shifter member in its shifted position against its bias, said means being operated by said operator control means for releasing the shifter member and means operated by the shifting of said transmission gear for moving one of the members of the two-way clutch into operative position without affecting said locking means.

2. In a transmission, the combination with a driving shaft and a driven shaft, and a gearing for connecting said driving and driven shafts including a gear for driving the driven shaft in a reverse direction, of a one-way clutch and a two-way clutch associated with said driven shaft, a shifter rail and a shifter fork for operating one of the members of said two-way clutch, means for biasing said shifter fork in a direction to render said two-way clutch inoperative, means operated by the shifting of said reverse drive gear for shifting one of the members of the two-way clutch into operative position against the action of said biasing means, an operator manipulated operating means for shifting said shifter rail, a latching means engaging said shifter rail for locking said shifter rail in its shifted position normally inactive until the shifter rail has reached the limit of its shifting movement and means operated by said operator means for releasing said latching means to permit said shifter rail to return to its normal position.

3. In a transmission, the combination with a driving shaft and a driven shaft, of a transmission gearing for connecting said shafts including a gear for driving the driven shaft in a reverse direction, a one-way clutch and a two-way clutch associated with said driven shaft, means for biasing one of the members of the two-way clutch to an inoperative position, means operated by the shifting of said reverse gearing for moving the two-way clutch against said biasing means and into an operative position, operator control means movable in one direction for shifting one of the members of the two-way clutch into operative position against the action of said biasing means, a latch rendered active by the shifting of said operator means in the same direction for locking said two-way clutch member in its shifted position and means operated by the movement of the operator means in the opposite direction for releasing said latch to permit the two-way clutch member to move into inoperative position.

4. In a transmission, the combination with a driving and a driven shaft, of a transmission gearing including gearing for driving the driven shaft in a reverse direction, a one-way clutch associated with said driving and driven shafts, a two-way clutch associated with said driving and driven shafts for rendering said one-way clutch ineffective, means for biasing one of the members of said two-way clutch to inoperative position, operator controlled means for positively shifting said two-way clutch member into operative position and for shifting said two-way clutch member to inoperative position through the instrumentality of said biasing means and means operated by the shifting of said gearing into reverse drive for shifting said two-way clutch member into operative position against the action of said biasing means while permitting said operator shifting means to remain unaffected.

5. In a transmission, the combination with a driving shaft and a driven shaft, of a transmission gearing including gearing for driving the driven shaft in a reverse direction, a one-way clutch associated with said driving and driven shafts, a two-way clutch associated with said driving and driven shafts for rendering said one-way clutch ineffective, a spring biasing one of the two-way clutch members to inoperative position, an operator controlled shift member for moving said two-way clutch member into operative position, a latch for holding said two-way clutch in operative position, said operator shift means being adapted to cause the return of said two-way clutch member to inoperative position at the will of the operator and means operated by the shifting of said gearing into reverse drive for shifting said two-way clutch member into operative position and placing said spring under compression, without affecting said operator shift means, to permit said spring to move the two-way clutch member to inoperative position when the reverse gear drive is disengaged, said latch being ineffective when the two-way member is operated by the reverse drive gear.

6. In a transmission, the combination with a driving and driven shaft, of a transmission gearing including a gear for driving the driven shaft in a reverse direction, a one-way clutch associated with said driving and driven shafts, a two-way clutch including a pair of relatively shiftable members associated with said driving and driven shaft for rendering said one-way clutch ineffective, a shift rod, a shift fork connected to said rod for operating one of the members of said two-way clutch, a coiled spring surrounding said shift rod and normally biasing said two-way clutch member to inoperative position, operator controlled means for positively operating said shift fork to shift said two-way clutch member into operative position, means for rendering said coiled spring ineffective to shift the two-way clutch member to inoperative position when so shifted by said operator controlled means, said operator controlled means being adapted to move the shift fork and with it the two-way clutch member to inoperative position through the medium of said coiled spring and means operated by the shifting of the reverse gear drive into driving engagement for moving said two-way clutch member into operative position and placing said coiled spring under compression to return said two-way clutch member to its inoperative position upon the shifting of said reverse drive gearing out of driving relation, without affecting said operator controlled shift means.

7. In a transmission, the combination with a driving and driven shaft, of a transmission gearing including gearing for driving the driven shaft in a reverse direction, a one-way clutch associated with said driving and driven shafts, a two-way clutch associated with said driving and driven shafts for rendering said one-way clutch ineffective, a shift fork for one of the members of said two-way clutch, a spring biasing said shift fork in one direction, operator controlled means for positively moving said fork in an engaging direction, connections between the operator controlled means and shift fork for rendering said spring ineffective to return the shift fork to its initial position when moved by the operator controlled means and means operated by the transmission gearing for shifting said fork against the tension of said spring while leaving the operator controlled shift means stationary, for placing said spring under tension to return the shift fork to initial position when the gear operated means releases the shift fork.

8. Controlling means for a free wheeling clutch lockup associated with a transmission having a shiftable reversing gear comprising an axially shiftable member, a coiled spring surrounding the axis of said member for biasing the same to inoperative position, operator manipulated means having a portion telescopically associated with said axially shiftable member positively connected to said member in one direction to move the member to operative position and movable relatively to the member in the opposite direction to cause the member to move to inoperative position under the instrumentality of said spring, means operated by the reverse gear for shifting the lockup member into operative position and placing the spring under tension and a latch for holding said axially shiftable member in operative position when shifted by said operator manipulated means, said latch being inoperative when said axially shiftable member is shifted by said reverse gear means.

9. In combination, a driving and a driven shaft, gearing for drivingly connecting said shafts including a shiftable gear for reverse drive, a one-way clutch associated with said driven shaft, a two-way clutch associated with said driven shaft, means for biasing said two-way clutch to inoperative position, operator controlled means for moving said two-way clutch to operative position and holding the same against the action of said biasing means, and means operated by the shifting of the said reverse drive gear into operative position for shifting said two-way clutch into operative position against the action of said biasing means, said operator controlled means remaining stationary during said shifting.

10. In combination, a free wheel unit including a casing, a free wheel clutch supported in said casing, lockup means for said free wheel clutch in said casing and control means mounted on said casing for controlling the operation of said lockup means including means for biasing the lockup means to inoperative position, means adapted for engagement with a shiftable gear of a transmission to shift said lockup means against the action of said biasing means, operator controlled means for moving said lockup means to operative position against the action of said biasing means and an operator controlled latch for holding said lockup means in operative position against the action of said biasing means, said latch being unaffected when the lockup means is operated by the shiftable gear.

11. Control means for the lockup member of a free wheeling clutch associated with a transmission having a shiftable reverse gear, in which the lockup clutch is operated by the shifting of said gear to reverse drive position, comprising means for biasing said lockup clutch to inoperative position, operator controlled means for shifting said lockup clutch to operative position and operator controlled locking means unaffected by the shifting of said lockup clutch by said reverse gear shift for locking said lockup clutch in operative position.

12. Control means for the lockup member of a free wheeling clutch comprising a shift rod, a spring for biasing the same in a non-lockup position, a latch adapted for engagement with said rod for holding said rod against the action of said spring and means for moving said rod in one direction while permitting a movement of said rod in said direction independently of said means, said means engaging and disengaging said latch.

13. Control means for the lockup member of a free wheeling clutch comprising a shift rod, a spring for biasing said rod in non-lockup position, a latch for said rod for holding the same in lockup position and operator controlled means for shifting said rod to lockup position while permitting an independent shift thereof and said means, when moved in one direction, biasing said latch towards locking position.

14. Control means for the lockup member of a free wheeling clutch comprising a shift rod, means for biasing said shift rod in non-lockup position, operator controlled means for shifting said rod to lockup position while permitting said rod to be shifted independently thereof, a latch for holding said rod in lockup position and operating means for said latch resiliently connected to said operator controlled means.

15. In a transmission, the combination with a driving and driven shaft, of a transmission gearing including gearing for driving the driven shaft in a reverse direction, a one-way clutch associated with said driving and driven shafts, a two-way clutch associated with said driving and driven shafts for rendering said one-way clutch ineffective, a pair of telescoping shifting members, one of which carries a shift fork for operating one of the members of said two-way clutch and which is movable in an engaging direction by and independently of the other shifting member, means for shifting the fork-carrying member with the shifting of the reverse drive gearing into and out of driving position, latching means for holding said fork in engaging position when moved by the other of said telescoping shifting members and which is inoperative when said fork is moved by the reverse drive shifting means.

JOHN M. SIMPSON.